United States Patent [19]

Bendig

[11] 4,292,949

[45] Oct. 6, 1981

[54] ELECTRONICALLY CONTROLLED COMBUSTION AIR MIXING VALVE FOR INTERNAL COMBUSTION ENGINES

[75] Inventor: Lothar Bendig, Ludwigsburg, Fed. Rep. of Germany

[73] Assignee: Filterwerk Mann & Hummel GmbH, Ludwigsburg, Fed. Rep. of Germany

[21] Appl. No.: 183,152

[22] Filed: Sep. 2, 1980

[30] Foreign Application Priority Data

Aug. 30, 1979 [DE] Fed. Rep. of Germany ....... 2935009

[51] Int. Cl.³ .......................................... F02M 31/00
[52] U.S. Cl. ................................... 123/556; 123/552
[58] Field of Search ................................ 123/556, 552

[56] References Cited

U.S. PATENT DOCUMENTS

| | | | |
|---|---|---|---|
| 3,450,118 | 6/1969 | LeBig | 123/556 |
| 4,161,930 | 7/1979 | Bendig | 123/556 |
| 4,207,848 | 6/1980 | Dinger | 123/556 |

Primary Examiner—Ronald H. Lazarus
Attorney, Agent, or Firm—Joseph A. Geiger

[57] ABSTRACT

A flapper-type combustion air mixing valve at the junction between a cold air intake duct and a warm air intake duct, the flapper being pivotally adjustable by means of an electropneumatic actuator which has a spring-loaded diaphragm separating an enclosed air-filled pressure chamber from an open drive chamber accommodating the spring and the flapper drive linkage. A heater coil in the pressure chamber receives variable power from a signal transformer, in response to a combustion air temperature sensor and a flapper position sensor. A load-responsive vacuum switch connected to the engine intake manifold switches the signal transformer between adjustments for a higher nominal control temperature for partial-load operation and a lower nominal control temperature for full-load operation.

8 Claims, 3 Drawing Figures

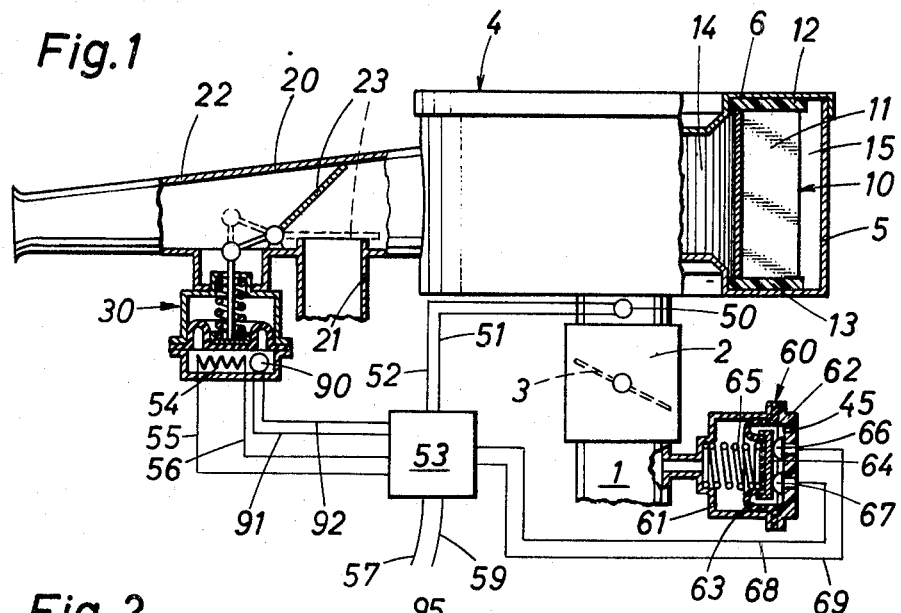
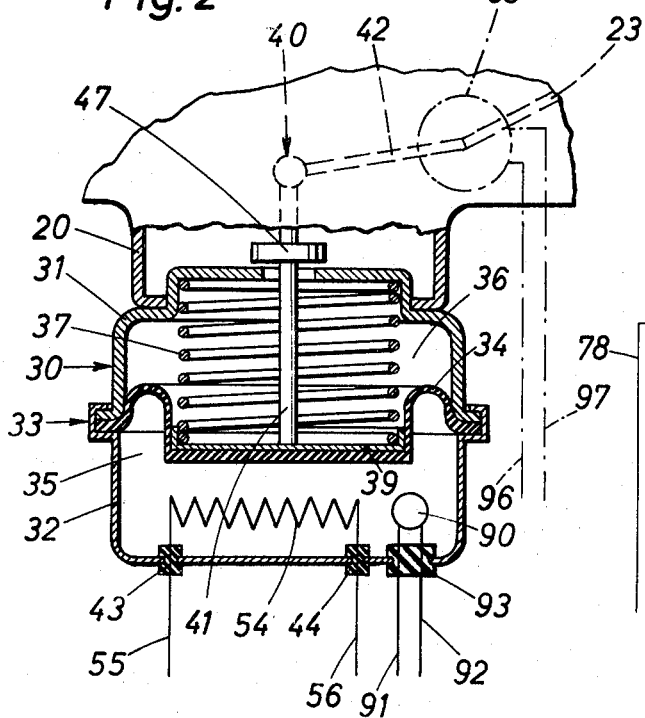

ELECTRONICALLY CONTROLLED COMBUSTION AIR MIXING VALVE FOR INTERNAL COMBUSTION ENGINES

BACKGROUND OF THE INVENTION

1. Field of the Invention

The present invention relates to air intake systems for internal combustion engines, and, more particularly, to an air intake system which is adapted for controlling the temperature of the combustion air by means of a flow proportioning valve which admits cold raw air and preheated raw air into the air intake system at an adjustable ratio.

2. DESCRIPTION OF THE PRIOR ART

It is now common practice to equip internal combustion engines, especially those used in vehicles, with devices for controlling the temperature of the combustion air. Such a device admixes preheated raw air to the raw air of ambient temperature, in order to obtain improved fuel combustion at low ambient temperatures, and in order to decrease the emission of pollutants during engine warmup.

While a relatively high air temperature contributes to better vaporization of the fuel, and hence to a more complete combustion, it is desirable to use combustion air of a somewhat lower temperature for full-load operation, because the higher density of cold air produces a higher power output by increasing the volumetric efficiency of the engine. It is therefore generally considered optimal to have a combustion air temperature of approximately 20° C.–30° C. during warmup and during partial-load operation and to allow a considerably lower combustion air temperature for full-load operation, at low ambient temperatures.

The known prior art devices utilize an air flow proportioning valve in the intake duct system which admits cold raw air and preheated raw air from an exhaust stove which is associated with the engine exhaust manifold. The operation of the flow proportioning valve may be controlled by a thermostat, e.g. a wax thermostat whose expansion and contraction displaces the flow proportioning valve. Alternatively, the valve may be driven by a pneumatic actuator device which utilizes the negative pressure of the engine intake manifold as a power source. Since the level of this negative pressure fluctuates with the level of engine load—maximum at idle and minimum at full load—it is necessary to add to the pneumatic actuator various corrective features, in addition to conventional temperature sensing means which operate to relieve the negative pressure, in response to an increase in the temperature of the combustion air which enters the carburetor.

In view of the aforementioned difficulties which accompany the use of the engine manifold vacuum as the motive power for the flow proportioning valve, attempts have been made to replace it with a different source of power. One such proposal is disclosed in German Auslegeschrift (Publ. Allowed Application) No. 20 17 983, where a wax thermostat has its push rod connected to the flapper of an air flow proportioning valve, while being surrounded by a heater coil whose heat output is controlled by a temperature sensor in the air intake system and an associated signal transformer.

A major shortcoming of this known device is the slowness of response of the wax thermostat which requires a considerable amount of time to expand during a heating phase and to contract, after the electric current to the heater coil has been shut off. In fact, the wax thermostat has a tendency to continue expanding, even after shutoff of the heating current. It follows that this device produces undesirable fluctuations in the resulting air temperature. In addition, it offers no possibility for the adjustment of a lower combustion air temperature for full-load operation.

SUMMARY OF THE INVENTION

It is a primary objective of the present invention to provide an improved temperature control device in conjunction with an air intake system which does not utilize the intake manifold vacuum to provide the motive power for the air flow proportioning valve, but which permits a control condition adjustment for full-load operation. Furthermore, the improved device is to have a quicker, more accurate response to temperature changes than the above-mentioned prior art device.

The present invention proposes to attain these objectives by suggesting an air flow proportioning valve in the form of a pivotable flapper which is driven by means of a pneumatic actuator whose movement derives from the expansion of air in an enclosed pressure chamber which contains a heater coil. The latter obtains its input from a signal transformer, in response to temperature signals received from a temperature sensor in the clean air space of the intake filter, a temperature sensor in the pressure chamber of the pneumatic actuator, and a load-responsive vacuum switch in the intake manifold. Additionally, or alternatively, it is also possible to employ a position sensor on the flapper pivot as a source of feedback information to the signal transformer.

The device of the invention produces a much more rapid response of the flow proportioning valve to changes in the temperature of the combustion air, and it also virtually eliminates any wake displacements of the valve adjustment mechanism. A further advantage resides in the fact that no vacuum lines are required, although the level of manifold vacuum is utilized to switch the signal transformer to a different control condition, when the engine operates with an open throttle, i.e. under full load. The present invention also makes it possible to prevent the conditions which lead to carburetor icing under full-load operation, when the temperature of the conbustion air entering the carburetor would otherwise be too low.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows:

FIG. 1 shows, in a schematic representation, an air intake system for a carburetor-equipped internal combustion engine, featuring an electronically controlled combustion air mixing device embodying the present invention;

FIG. 2 shows, in an enlarged cross section, the electro-pneumatic valve actuator of the device of FIG. 1; and FIG. 3 shows a modified load-responsive vacuum switch, as an alternative component of the device of FIG. 1.

DESCRIPTION OF THE PREFERRED EMBODIMENT

Referring to FIG. 1 of the drawing, there is shown, in a schematic representation, an air intake system for a carburetor-equipped internal combustion engine, the engine itself being not shown. The system consists of an air intake manifold 1 which is attached to the cylinder head of the engine and which carries a carburetor 2 with a pivotably adjustable main throttle 3. On top of the carburetor 2 is mounted an air intake filter 4 which is enclosed within a pot-shaped housing 5 and a removable housing cover 6. The interior space of the filter housing is occupied by an annular filter element 10 through which air flows radially inwardly towards the carburetor. The filter element 10 consists of a ring of pleated filter paper 11 which is held between resilient upper and lower end cover gaskets 12 and 13. The latter positions the filter element 10 between the bottom of the filter housing 5 and the housing cover 6. The filter element 10 thus forms a central clean air space 14, being surrounded by the raw air space 15.

Raw combustion air reaches the raw air space 15 through an air intake snorkel 20 which has a substantially horizontal cold air intake duct 22 to which is joined a substantially vertical warm air intake duct 21. Just upstream of this duct junction is arranged a pivotable flapper 23 which, in one end position, closes off the warm air intake duct 21 while opening the cold air intake duct 22, and, in the other end position, closes off the cold air intake duct 22 while opening the warm air intake duct 21.

To the pivotable flapper 23 is connected an electropneumatic actuator 30 which is mounted on the lower side of the air intake snorkel 20. The actuator 30 consists of an upper housing shell 31 and a matching lower housing shell 32, cooperating flanges of the two shells clamping between them a rubber diaphragm 34 in a crimped flange connection 33. The diaphragm 34 divides the interior space of the actuator 30 into an air-filled pressure chamber 35 within the lower housing shell 32 and an open drive chamber 36 within the upper housing shell 31. The upper chamber accommodates a return spring 37 in the form of a compression spring, the latter having its upper extremity seated and supported in a recess of the upper housing shell 31 and its lower extremity resting against a metallic supporting dish 39 which is received inside a matchingly shaped central recess of the diaphragm 34.

A drive linkage 40 reaches from above into the drive chamber 36. The linkage consists of a push rod 41 and a drive arm 42 which is pivotably connected to the upper end of the push rod 41. The lower end of push rod 41 is rigidly attached to the supporting dish 39. On the push rod 41 is further arranged an abutment collar 47, at a predetermined distance above the upper housing shell 31, so that the collar 47 will serve as a stop against the action of the return spring 37, when the electropneumatic actuator 30 and its drive linkage 40 with attached flapper 23 are handled as a separate subassembly, detached from the air intake snorkel 20. Once this subassembly is mounted in place, as shown in FIGS. 1 and 2, the lower end position of the drive linkage 40 is no longer determined by the abutment collar 47, but by the upper end position of the flapper 23, in abutment against the cold air intake duct 22.

Downstream of the air flow proportioning flapper 23, and preferably within the clean air space 14, is arranged a temperature sensor 50 which produces an electrical signal indicative of the temperature of the mixed combustion air, as the latter enters the carburetor 2. The temperature sensor 50 is an electrical resistance which, in response to changes in the passing combustion air, changes its resistance value, thereby giving a continuous reading temperature of the air mixture. This temperature signal is fed to a signal transformer 53, via two electrical wires 51 and 52.

The pressure chamber 35 is hermetically sealed against the outside and against the adjacent drive chamber 36. Its outside walls, formed by the lower housing shell 32, are preferably metallic, so as to obtain a rapid head transfer to the surrounding ambient air during a cooling phase. Inside the pressure chamber 35 is arranged a heater coil 54 which receives a heating current of adjustable intensity from an electrical power source, typically the vehicle battery, via electrical wires 56 and 57, the level of the heating current being controlled by the signal transformer 53. Where the wires 56 and 57 pass through the wall of the lower housing shell 32, they are sealed and insulated against the latter by means of suitable rubber grommets 43 and 44.

On the downstream side of the main throttle 3 of the carburetor 2 is arranged a load-responsive vacuum switch 60 which opens an electrical circuit connection, when the negative pressure inside the engine intake manifold 1 reaches a predetermined level. This switching action distinguishes between two different load conditions of the internal combustion engine. In the embodiment shown in FIG. 1, the vacuum switch 60 has a hermetically enclosed housing which consists of a metallic housing shell 61 and a plastic housing shell 62, a rubber diaphragm 63 being clamped between the shell flanges.

The diaphragm 63 carries on one side a metal contact plate 64 which, under the influence of a compression spring 65 engaging it from the opposite side, bridges two contact points 66 and 67 in the plastic housing shell 62. The compression spring 65 is arranged in the housing shell 61 which communicates with the air intake manifold 1, so that, when a vacuum is generated inside the latter at idling or partial-load operation of the engine, the diaphragm 63 is pulled against the action of spring 65 and the contact plate 64 is lifted from the contact points 66 and 67. The latter are connected to the signal transformer 53 by means of electrical wires 68 and 69. A breather orifice 45 in the housing shell 62 allows air to enter and escape from the head space of the vacuum switch 60, when the diaphragm 63 moves away from or towards the contact points 66 and 67.

In FIG. 3 is shown a modified vacuum switch 70 which can be utilized in the place of the vacuum switch 60 of FIG. 1. Again, the switch assembly includes a plastic housing shell 71 and a metallic housing shell 72, the two shells clamping between their flanges a rubber diaphragm 73. In this case, however, it is the plastic housing shell 71 which is attached to the air intake manifold 1 of the engine and which carries two elevated contact points 76 and 77. The latter are surrounded by a compression spring 75, one extremity of which bears against a contact plate 74 which is carried by the diaphragm 73. The normal position of this vacuum switch is therefore an open position in which the contact plate 74 is held at a distance from the contact points 76 and 77, as shown in FIG. 3. Electrical wires 78 and 79 connect the contact points to the signal transformer 53, and a breather orifice 46 in the housing shell 72 allows air to move into and out of the vacuum switch during switching displacements of the diaphragm 73. As can readily be seen from the drawing, the two versions of a load-responsive vacuum switch differ from each other essentially in terms of their normal contact positions, the switch 60 of FIG. 1 being normally closed, and the switch 70 of FIG. 3 being normally open.

Inside the pressure chamber 35 of the electropneumatic actuator 30 is further arranged a temperature sensor 90, the purpose of which is to provide a feedback signal to the signal transformer 53 over the wires 91 and 92. The latter reach through the wall of the lower housing shell 32 inside an insulating grommet seal 93. The feedback signal obtained from the temperature sensor 90 is indicative of the displacement position of the diaphragm 34 and hence of the angular position of the flapper 23.

In the place of the aforementioned feedback information obtained by means of the temperature sensor 90, it is also possible to arrange a displacement transducer on the pivot shaft of the flapper 23 itself. Such an arrangement is indicated by stippled lines in FIG. 2. The displacement transducer 95 may be a rotary potentiometer or a rotary capacitor, for example, which produces a position-indicative signal. The wires 96 and 97 feed this signal to the signal transformer 53.

The operation of the above-described combustion air temperature control system is as follows: If, at a relatively low ambient temperature, the internal combustion engine is started from a cold condition and/or operated at partial load, the flow proportioning flapper 23 is in the position shown in FIG. 1, in which it closes off the cold air intake duct 22 while opening the warm air intake duct 21. This is so, because the air inside the pressure chamber 35 of the electro-pneumatic actuator 30 is still cold and the diaphragm 34 is in its lowest position. It follows that the intake filter 4 receives all of its raw air through the warm air intake duct 21 which is connected to an exhaust stove (not shown). Only preheated combustion air thus flows through the filter element 10 and through the carburetor 2 into the internal combustion engine, thus accelerating the warmup of its components.

While this warmup operation takes place, the load-responsive vacuum switch 60 is subjected to the negative pressure which is present in the engine intake manifold 1, so that the contact plate 64 of the switch is lifted from the contact points 66 and 67, against the action of the spring 65, thereby opening a circuit portion of the signal transformer 53. The circuitry of the latter is so arranged that the opening of this connection, reflecting partial-load operation, sets the circuitry for a nominal control temperature of 30° C., for example. Accordingly, for as long as the temperature sensor 50 in the clean air space 14 signals to the signal transformer 53 an air temperature below 30° C., the circuitry of the signal transformer 53 will produce no heating current for the heater coil 54 of the electropneumatic actuator 30. The flapper 23, therefore, remains in its rest position in which it admits only preheated raw air from the warm air intake duct 21.

As the warmup operation of the engine continues, the temperature of the preheated air which enters through the warm air intake duct 21 rises progressively, until it reaches and exceeds the nominal control temperature of 30° C. At this point, the signal from the temperature sensor 50 starts to produce an output value in the signal transformer 53, with the result that power is supplied to the heater coil 54. The amount of power supplied to coil 54 reflects itself in a corresponding rise in the air temperature inside the pressure chamber 35, so that the air exerts an expsnsive pressure against the diaphragm 34, thereby lifting it in opposition to the return spring 37 and pivoting the flapper 23 in a clockwise direction. This flapper displacement reduces the flow cross section for the preheated raw air and at the same time allows a certain flow of cold raw air to enter and mix with the preheated raw air.

The flapper displacement stops, when the resultant temperature of the mixed combustion air is 30° C. at the temperature sensor 50. The temperature sensor 90 simultaneously feeds to the signal transformer 53 information on the level of the air temperature inside the pressure chamber 35 and consequently on the angular position of the flapper 23. This feedback information is used to prevent self-induced adjustment oscillations, by limiting the displacement of the flapper 23. As mentioned earlier, the angular position of the flapper 23 can also be signalled to the signal transformer 53 by means of a rotary displacement transducer which is directly connected to the pivot axis of the flapper 23.

An opening movement of the main throttle 3 in the carburetor 2, for full-load operation of the engine will reduce the negative pressure inside the engine intake manifold 1 to such an extent that the pressure differential on the diaphragm 63 inside the vacuum switch 60 is insufficient to overcome the pressure of spring 65, with the result that the spring 65 will move the contact plate 64 against the contact points 66 and 67, thereby closing the circuit portion which contains the wires 68 and 69 (see FIG. 1). This switching action produces a different control condition in the circuitry of the signal transformer 53, so that the nominal combustion air temperature is now 10° C., for example, instead of previously 30° C., the nominal control temperature for warmup and partial-load operation. The lower nominal temperature for full-load operation increases the volumetric efficiency of the internal combustion engine, thereby raising its power output. On the other hand, the device will also effectively prevent carburetor icing, which may occur at temperatures near the freezing point, by mixing preheated raw air to the cold raw air, whenever the temperature sensor 50 indicates a combustion air temperature which is below the nominal full-load temperature of 10° C.

The pressure-responsive vacuum switch of FIG. 3 may be employed in the place of the vacuum switch 60 of FIG. 1, if the circuitry of the signal transformer 53 is adapted accordingly, viz. if the partial-load control condition is obtained with bridged contact points 67 and 77 of the wires 78 and 79 and the full-load control condition requires the circuit portion of wires 78 and 79 to be opened.

The circuitry of the signal transformer 53 consists essentially of a Wheatstone bridge and of a d-c amplifier. The two comparison branches of the Wheatstone bridge contain the signal resistances of the temperature sensor 50 and of the flapper position feedback 90 or 95, respectively. An additional resistance is connected into the comparison branch which contains the temperature-responsive resistance, when the nominal control temperature is the higher temperature of 30° C., for partial-load operation, and this additional resistance is eliminated by the load-responsive vacuum switch (60 or 70, respectively) when the temperature control condition for full-load operation, at nominally 10° C., is called for.

A diode in the connection between the bridge and the amplifier eliminates negative output signals, when the measured combustion air temperature is lower than the nominal temperature.

It should be understood, of course, that the foregoing disclosure describes only a preferred embodiment of the invention and that it is intended to cover all changes and modifications of this example of the invention which fall within the scope of the appended claims.

I claim the following:

1. A device for controlling the temperature of the combustion air in the air intake system of an internal combustion engine, the device comprising in combination:
   a cold air intake duct for the intake of air of ambient temperature;
   a warm air intake duct for the intake of preheated air coming from an air heater which is associated with the engine;
   a duct junction where the cold air intake duct and the warm air intake duct are joined;
   a combustion air duct leading from the duct junction to the cylinder or cylinders of the internal combustion engine;
   an air flow proportioning valve associated with the cold air and warm air intake ducts, at the duct junction, the valve being adjustable in its position so as to progressively open one of the two ducts while correspondingly closing the other, thereby adjusting the relative flow rates at which cold air and preheated air are drawn into the combustion air duct;
   means for sensing the combustion air temperature in the combustion air duct and for generating an electrical signal indicative of the temperature level; and
   means for adjusting the position of the air flow proportioning valve in response to the electrical control signal supplied by the temperature sensing means so that, when the air temperature in the combustion air duct rises, the corresponding control signal induces the valve position adjusting means to adjust the position of the air flow proportioning valve in the direction of closing the warm air intake duct and opening the cold air intake duct; and wherein
   the valve position adjusting means includes a pneumatic actuator with an enclosed pressure chamber of variable volume and a return-biased drive linkage connecting a movable wall portion of the pressure chamber to the flow proportioning valve; and
   the pneumatic actuator further includes a heat source of variable output arranged to adjustably raise the temperature in the pressure chamber above the ambient temperature, in response to changes in the electrical control signal.

2. A device as defined in claim 1, wherein
   the movable wall portion of the pneumatic actuator is a diaphragm;
   the drive linkage includes a push rod which extends away from the diaphragm while being spring-biased against the diaphragm.

3. A device as defined in claim 1 or claim 2, wherein
   the heat source of the pneumatic actuator is an electrical resistance heater which is arranged inside the pressure chamber of the actuator.

4. A device as defined in claim 1 or claim 2, wherein
   at least a major portion of the pressure chamber is enclosed by a metallic wall, for convective cooling off of the inside of the pressure chamber when the heat source is shut off.

5. A device as defined in claim 1, wherein
   the valve position adjusting means includes an electrical signal transformer with a comparison bridge circuit and an amplifier, the temperature-level-indicating electrical signal being an input to the bridge circuit, and an electrical heating current for the heat source of the pneumatic actuator being the output from the amplifier; and
   the valve position adjusting means further includes a feedback circuit linking the pneumatic actuator to the comparison bridge circuit of the signal transformer by means of a feedback sensor whose electrical output signal reflects the effect of the heat source.

6. A device as defined in claim 5, wherein
   the feedback sensor is a temperature sensor which is arranged inside the pressure chamber of the pneumatic actuator.

7. A device as defined in claim 5, wherein
   the feedback sensor is a position transducer which is operatively connected to a movable part of the air flow, proportioning valve.

8. A device as defined in any one of claims 1, 2 or 5–7, wherein the device is adapted for a carburetor-equipped internal combustion engine, further including:
   a pressure-responsive switch which is exposed to the negative pressure in the engine intake manifold, downstream of the carburetor, the switch being electronically connected to the signal transformer in such a way that, when less than a predetermined level of negative pressure is present in the intake manifold, it switches the operation of the signal transformer from a partial-load mode, in which a relatively high combustion air temperature is maintained, to a full-load mode in which a relatively low air temperature is maintained.

* * * * *